J. R. CARDWELL.
DRAFT GEAR.
APPLICATION FILED FEB. 4, 1909.
1,034,199.
Patented July 30, 1912.
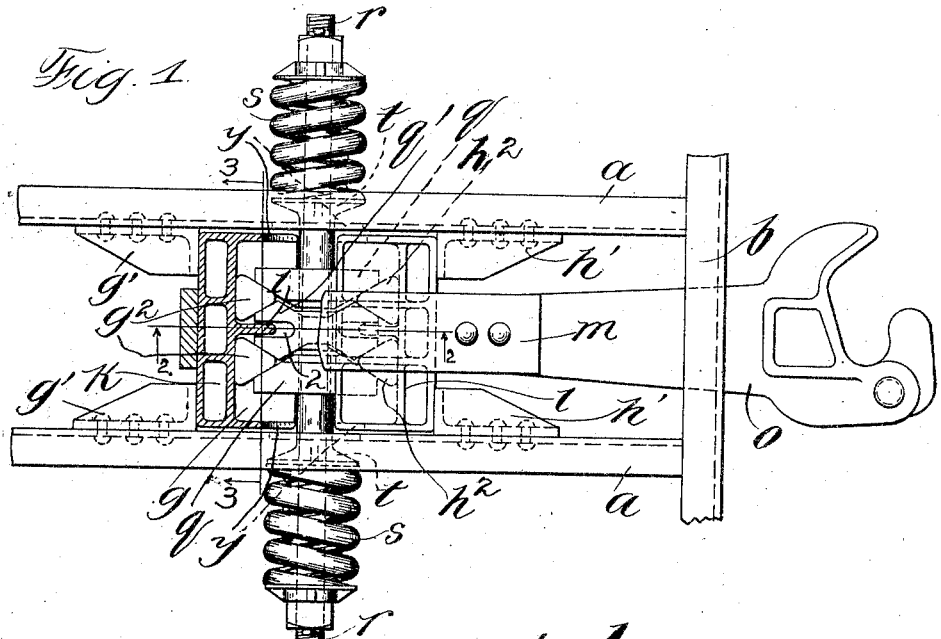
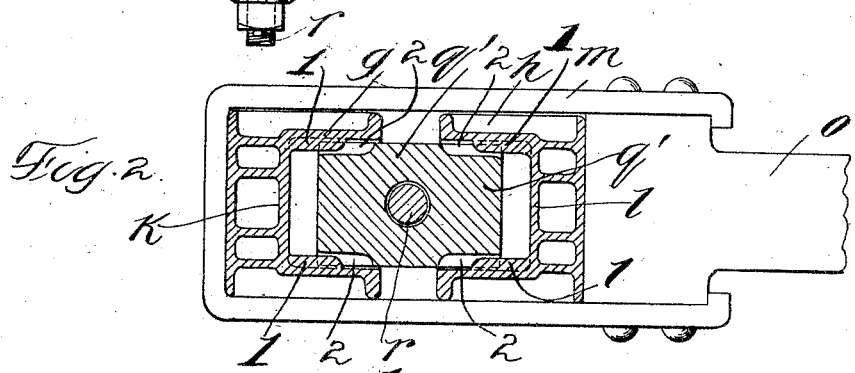
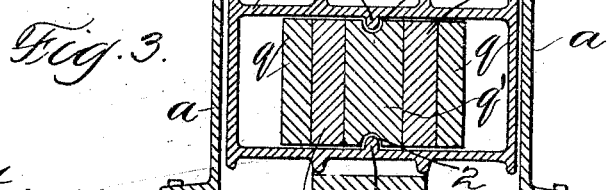
Witnesses:
R. E. Atherton.
Henry G. Stroh
Inventor:
James R. Cardwell
By G. L. Cragg
Attorney.

UNITED STATES PATENT OFFICE.

JAMES R. CARDWELL, OF CHICAGO, ILLINOIS, ASSIGNOR, BY MESNE ASSIGNMENTS, TO UNION DRAFT GEAR COMPANY, A CORPORATION OF ILLINOIS.

DRAFT-GEAR.

1,034,199.  Specification of Letters Patent.  Patented July 30, 1912.

Application filed February 4, 1909. Serial No. 476,085.

*To all whom it may concern:*

Be it known that I, JAMES R. CARDWELL, citizen of the United States, residing at Chicago, in the county of Cook and State of Illinois, have invented a certain new and useful Improvement in Draft-Gear, of which the following is a full, clear, concise, and exact description, reference being had to the accompanying drawings, forming a part of this specification.

My invention relates to friction draft-gear employed in railway service, and, in its preferred embodiment, is of particular service in connection with the draft-gear forming the subject matter of my United States Letters Patent No. 819,266, dated May 1, 1906, and No. 861,636, dated July 30, 1907, though I do not wish to be limited in all embodiments of the invention to the adaptation of the invention to the draft-gear of my said patents.

My invention is designed to provide means for preventing lateral movement of friction elements which is not prevented by the companion friction elements in the gear structures.

In the particular apparatus in which I have embodied my present invention, there are included relatively movable triangular friction blocks located in each of two pocketed follower-plates, a central longitudinally disposed friction element entering the pockets of the follower-plates, and engaging at its ends between two triangular blocks in the pocket of each follower-plate, transversely movable friction blocks also entering the pockets of the follower-plates and between which the aforesaid central longitudinally disposed friction element is disposed, a bolt passing through the three friction blocks that extend between the follower-plates and enter the pockets thereof to engage the triangular friction blocks within such pockets, and springs surrounding the through-bolt for exerting pressure upon the said three friction blocks, one spring being disposed about one end of the through-bolt and the other spring about the other end of the through-bolt. It sometimes happens that the spring mechanism is not adjusted to preserve the central longitudinally disposed friction element in proper alinement with the draw-bar, this latter friction element frequently being disposed con- siderably to one side of the proper line or at an angle thereto. By means of my invention, no special care need be taken in so adjusting the mechanism as to preserve the desired relative positions of the parts.

The object of my invention may be accomplished in various ways. In the preferred embodiment of the invention, slight guide ribs are formed at the middles of the horizontal walls of the pockets, these ribs being disposed in alinement with the draw-bar or coupler yoke and facing each other. The central longitudinally disposed friction element is provided at its ends with guide recesses which receive said guide ribs, these recesses being provided upon the top and bottom of such central longitudinally disposed friction element and are coincident with the vertical median plane passing longitudinally through said central longitudinally disposed friction element. Sufficient endwise clearance is afforded between the ribs and the recesses or grooves receiving the same as to permit the proper relative movement of the follower-plates and friction elements, said ribs preventing lateral movement of the central longitudinally disposed friction element, so that the friction blocks of the gear are always centrally disposed between the center-sills or draft timbers.

I will explain my invention more fully by reference to the accompanying drawing, showing one embodiment thereof, in which—

Figure 1 is a plan view of the draft rigging, partially in section, as constructed in accordance with the preferred embodiment of the invention. Fig. 2 is an elevation, taken partially in section, along line 2 2 of Fig. 1. Fig. 3 is a view in cross-section on line 3 3 of Fig. 1.

Like parts are indicated by similar characters of reference throughout the different figures.

The sills *a a* may be of any well known or suitable construction and may be united by any suitable means, a strut *b* being partially indicated for the purpose of this union. It is to be understood that the sills *a a* are either the center-sills or draft-sills, the term "sills" being used in a broad sense. A plate *f* is disposed beneath and is attached to the sills. The openings of the pockets *g h* directly face each other. The vertical end walls *k l* of the follower-plates are at the longitudinal ends of the friction gearing, the yoke m surrounding the follower-plates and engaging ribbed portions thereof, said yoke being attached to the shank o of the coupler-bar. When a pull is exerted upon the coupler, the follower-plate g remains in place with respect to the yoke, the two plates g h being moved relatively toward each other, as will appear. When a push is exerted upon the coupler, the plate h is maintained in position with respect to the coupler yoke with like results. The stops $q^1$ attached to the sills, serve to engage the element g to prevent longitudinal movements of said element when a push is exerted upon the coupler. The stops $h^1$, also secured to the sills, engage the element h to prevent the same from moving longitudinally when a pull is exerted upon the coupler.

The pocketed follower-plates g h carry elements $g^2$ $h^2$ that are provided with friction surfaces that incline toward the center of the structure and which coöperate with correspondingly inclined surfaces provided upon the friction blocks q q that are designed to travel transversely of the sills. The elements $g^2$ $h^2$ are loose with respect to the follower-plates and are triangular in plan, there being two triangular blocks for each follower-plate as indicated. I employ a central longitudinally disposed friction block or member $q^1$ which is provided with inclined friction surfaces that engage the adjacent friction surfaces upon each set of triangular friction blocks. The friction blocks or members q q are provided with apertures extending transversely of the sills through the blocks, through which apertures the bolt r is passed, which bolt is surrounded with coiled springs s s that engage at their inner ends, castings t t that are desirably separately formed with respect to the block q q for utility and convenience in assemblage and construction, the castings t t or block mechanism passing through holes in the sills into engagement with the blocks. It will be seen that the rod r and the springs s are placed transversely of the sills. The rod r together with the nuts and spring engaging plates at its outer ends constitutes a preferred form of spring abutment structure against which the springs may work in forcing the transversely movable friction blocks into engagement with the middle friction block. When the member g is moved forward upon a sufficient pull upon the shank of the coupler and when the member h is moved rearwardly upon a sufficient push upon the shank of the coupler, the blocks q are moved apart against the force of the springs s s which are proportioned to offer the proper resistance to the relative motion between the elements g h for the purpose of the gearing, the springs s effecting the restoration of the parts to their normal positions when normal strain upon the shank of the coupler has been restored.

As indicated, the sills are provided with oblong recesses y, midway between the ends of which the bolt or rod r is normally disposed, the said rod and springs s being pushed or pulled longitudinally of the sills toward one end or the other of said slots, according to the direction of movement of the coupler yoke, the rate of travel of the rod and springs in the construction shown being approximately one-half of the rate of movement of the coupler yoke.

The gear thus far specifically described in connection with the drawing has been widely adopted and is thoroughly practicable. In order, however, to insure the maintenance of the central position of the central longitudinally disposed friction element $q^1$, I provide guide mechanism preferably including slight ribs 1, which are formed at the middles of the horizontal walls of the pockets in the follower-plates g h, these ribs being disposed in alinement with the draw-bar or coupler yoke and facing each other. The central longitudinally disposed friction element $q^1$ is provided at its ends with recesses 2, which are complemental to and receive said ribs, these recesses being provided upon the top and bottom of such central longitudinally disposed friction element and are coincident with the vertical median plane passing longitudinally through said central longitudinally disposed friction element. Sufficient endwise clearance is afforded between the ribs 1 and the recesses or grooves 2 receiving the same, as to permit the proper relative movement of the follower-plates and friction elements, said ribs preventing lateral movement of said central longitudinally disposed friction element, so that the friction blocks of the gear are always centrally disposed between the center-sills or draft timbers a a. I speak of "lateral" in the broad sense of transverse to the length of the car and irrespective of the planes of the moving parts.

The ribs 1, by being disposed in the follower-plates, occupy a fixed vertical plane midway between the sills a a, thereby confining the central longitudinally disposed friction block $q^1$ to such plane.

While I have herein shown and particularly described the preferred embodiment of my invention containing one form of guide mechanism, I do not wish to be limited to the precise details of construction shown, but,

Having thus described my invention, I claim as new and desire to secure by Letters Patent the following:—

1. In a draft gear, in combination, opposed followers, a plurality of laterally movable wedging elements associated with each follower, a wedge member coöperating with the wedging elements associated with both followers and being relatively longitudinally movable with reference to such followers, and guiding means for restricting the lateral movement of the wedge member.

2. In a draft gear, in combination, opposed followers, a plurality of laterally movable wedging elements associated with each follower, a wedge member coöperating with the wedging elements associated with both followers and being relatively longitudinally movable with reference to such followers, and guiding means for restricting the lateral movement of the wedge member, such guiding means comprising a rib and groove engagement of the wedge member with the followers.

In witness whereof, I hereunto subscribe my name this 2d day of February A. D., 1909.

JAMES R. CARDWELL.

Witnesses:
L. G. STROH,
G. L. CRAGG.